United States Patent [19]

Thomas

[11] Patent Number: 5,143,658
[45] Date of Patent: Sep. 1, 1992

[54] ALTERNATING SHEET EVAPORATIVE COOLING PAD

[75] Inventor: Patricia T. Thomas, North Fort Myers, Fla.

[73] Assignee: Munters Corporation, Fort Myers, Fla.

[21] Appl. No.: 763,938

[22] Filed: Sep. 23, 1991

[51] Int. Cl.⁵ ............................................. B01F 3/04
[52] U.S. Cl. .................................................. 261/112.2
[58] Field of Search ..................................... 261/112.2

[56] References Cited

U.S. PATENT DOCUMENTS

| | | | |
|---|---|---|---|
| 3,262,682 | 7/1966 | Bredberg | 261/112.2 |
| 3,792,841 | 2/1974 | Munters | 261/112.2 |
| 4,139,584 | 2/1979 | Holmberg | 261/112.2 |

Primary Examiner—Tim Miles
Attorney, Agent, or Firm—Fitzpatrick, Cella, Harper & Scinto

[57] ABSTRACT

An improved contact body for use in a liquid gas contact apparatus formed of first and second sets of corrugated sheet material arranged with the sheets of the first set disposed alternately with the sheets of the second set. The corrugations of the sheets define passageways which penetrate the contact body from edge to edge with both vertical and horizontal components of direction. The passageways are simultaneously passed by a flow of gas in one direction and liquid in the other direction in either counterflow or cross-flow in the contact apparatus. The corrugations of the first set of sheets cross the corrugations of the second set of sheets at an acute angle in the range of 15° to 80°. Corrugations of the first set of sheets have a greater inclination to the horizontal plane of the contact apparatus than the corrugations of the second set of sheets and the corrugations of the first set of sheets have a smaller amplitude dimension than the corrugations of the second set of sheets. Corrugations in the first set of sheets are inclined upwardly in the direction of gas flow and the corrugations in the second set of sheets are inclined downwardly in the direction of gas flow whereby undesirable lateral displacement of the liquid stream caused by the gas flow is counteracted and the liquid is distributed uniformly and evenly over the sheets. An improved efficiency is also achieved with little or no increase in pressure drop as compared to contact bodies having both corrugated sheets of the larger amplitude.

12 Claims, 2 Drawing Sheets

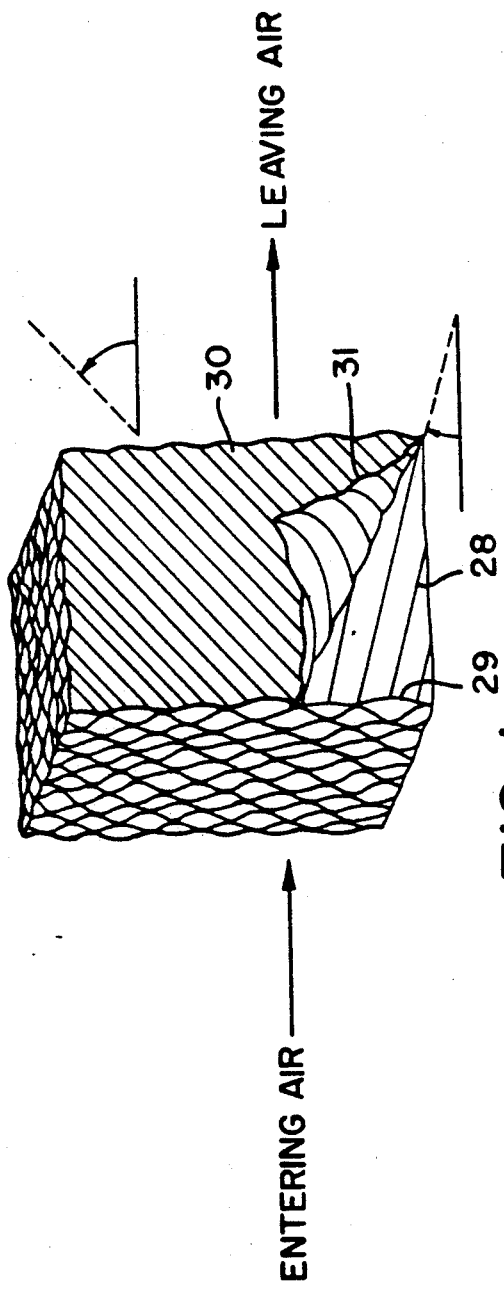
FIG. 1
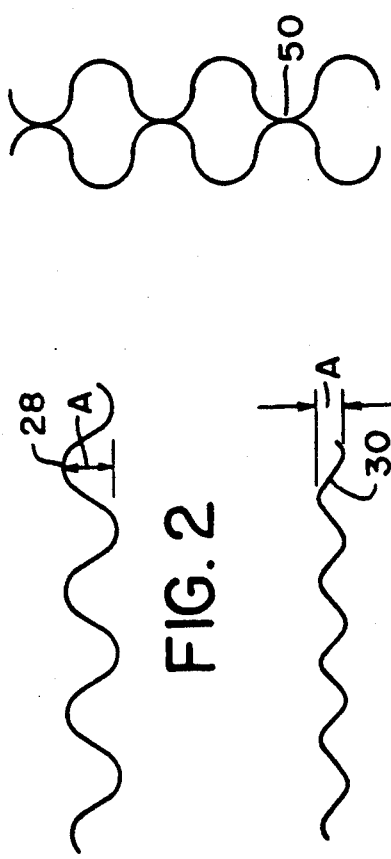
FIG. 2
FIG. 3
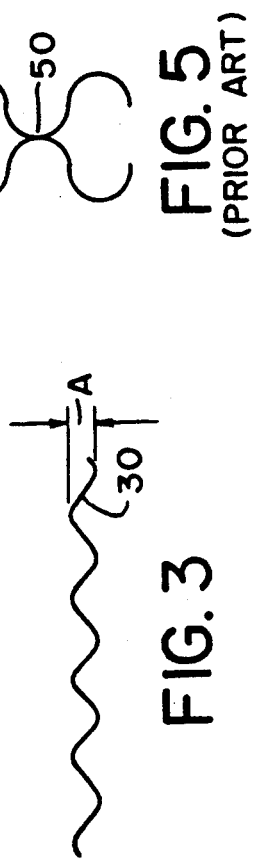
FIG. 5
(PRIOR ART)
FIG. 6

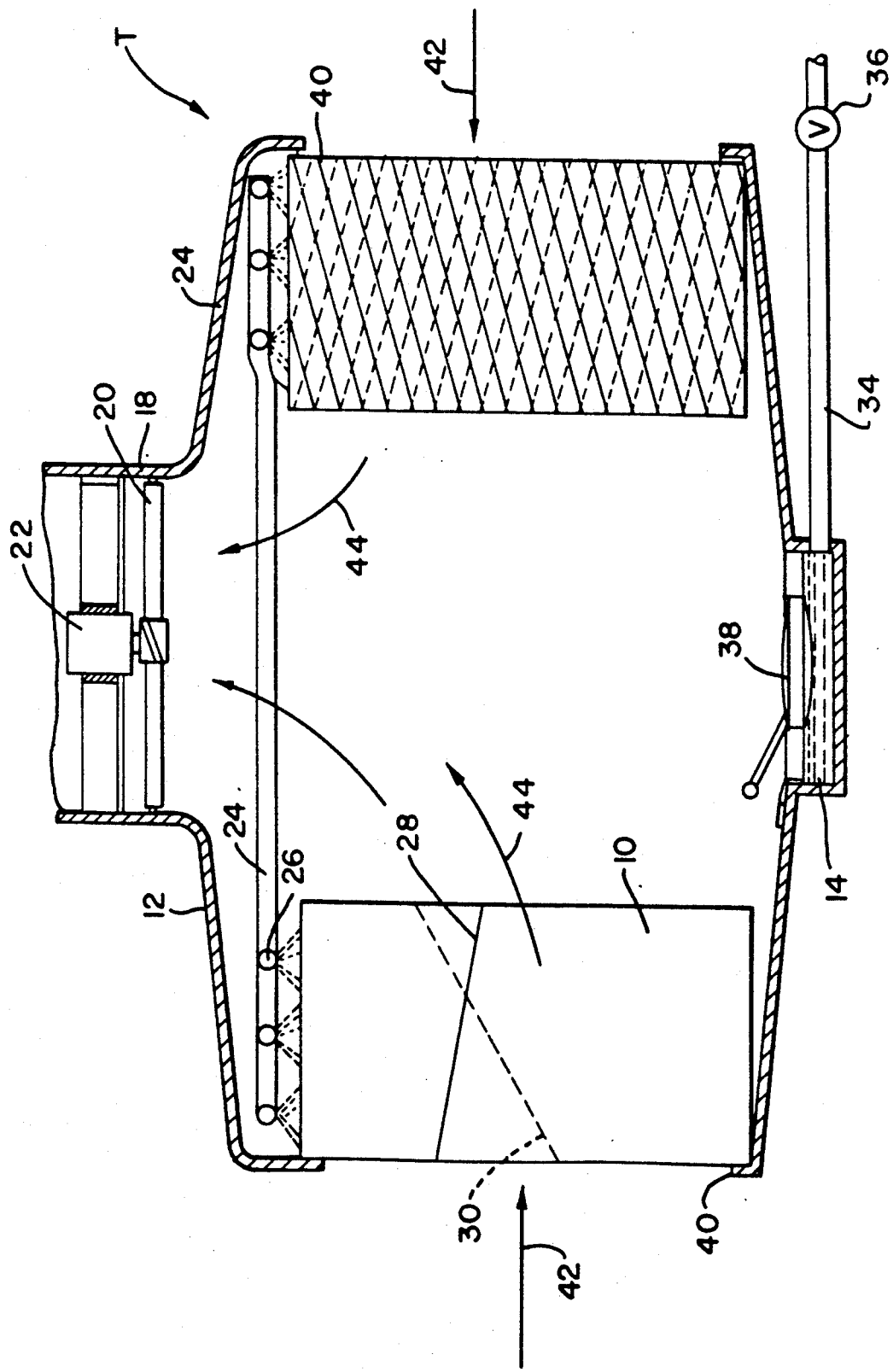

ALTERNATING SHEET EVAPORATIVE COOLING PAD

BACKGROUND OF THE INVENTION

The present invention relates to an improved contact body for use in a liquid and gas contact apparatus and, in particular, to a contact body formed of alternating corrugated sheets of material wherein the corrugations in adjacent sheets are positioned at an angle to each other.

Contact bodies or packings for gas and liquid contact apparatus have been previously proposed in which the contact body is formed of adjacent corrugated sheets of material. Corrugated sheets are placed adjacent one another with their ridges or crests contacting each other so that channels or passageways are formed between the sheets to provide continuously varying width passages in the sheets which result in the flow direction of the gas and liquid being repeatedly changed during passage through the body. It has been found that contact bodies of this type are highly efficient in operation. Once such contact body is shown in U.S. Pat. No. 3,262,682.

An improvement of the basic contact body shown in Bredberg U.S. Pat. No. 3,262,682 was developed and disclosed in U.S. Pat. No. 3,792,841 to Munters. According to that patent a contact body of the cross-flute type for use in cross-flow cooling towers, or the like, was constructed such that the angles of inclination between the folds of the corrugations in adjacent sheets were varied to obtain optimum exchange between the fluids. In particular, the corrugations of one set of sheets are arranged to cross the corrugations of the adjacent second set of sheets at acute angles in the range of 20° to 80°. The corrugations of the first set of sheets described in that Munters' patent are arranged to have a greater inclination to the horizontal plane of the contact body than the corrugations of the second set of sheets, with the corrugations in the first set of sheets being inclined upwardly in the direction of gas flow. This arrangement produces a bisector angle of the corrugations of the respective sheets which inclined downwardly opposite to the direction of gas flow thereby to counteract the undesirable lateral displacement of liquid caused by the gas flow with the result that liquid is distributed uniformly over the sheets. This Munters' type pack or contact body has been highly successful in use and generally accepted as a cooling tower medium and in evaporative air cooling applications.

The use of unequal angles in adjacent corrugated sheets as described in the Munters' patent directs more water to the air-entering side of the contact body. This produces two advantages. First, it directs more water to the entry side of the media where dirt and deposits occur. Secondly, it prevents the liquid from becoming entrained in the airstream at velocities of less than 800 feet per minute and water loadings of less than 1.5 gallons per minute per square foot of top surface area of the contact body.

In evaporative coolers and humidifiers in which the Munters' type of contact body has normally been used, a water recirculating system is typically provided. In such systems a certain amount of water is normally bled off from the system when the water becomes concentrated with contaminants due to evaporation. Then a makeup source of water provides fresh water to makeup for evaporation and bleed-off. However, due to water restrictions and lack of maintenance, it has been found that bleed-off may not be adequate to keep the contact body media clean, even with the Munters' construction. As a result, the openings, particularly on the air inlet side of the contact body, slowly become plugged enough to seriously restrict air flow. One solution to this problem has been to provide contact bodies with relatively large amplitude heights in corrugations in order to increase the size of the passageways. However, this results in a reduction of the available evaporative surface and considerably less cooling.

OBJECT OF THE INVENTION

It is an object of the present invention to provide an improved contact body which has improved efficiency and improved ability to maintain the passageways in the body clear.

Another object of the invention is to provide a contact body which minimizes the pressure drop of gas through the body to save on power requirements while improving the efficiency of cooling of the body.

Yet another object of the invention is to provide a further improvement of contact bodies of the type described in the above-mentioned Bredberg and Munters patents.

SUMMARY OF THE INVENTION

In accordance with an aspect of the present invention, a contact body for use in a liquid gas contact apparatus is provided in which the gas and liquid flow in cross-flow relationship to one another with the contact body being composed of first and second sets of corrugated sheets having corrugations disposed in a direction transversely of the horizontal plane of the contact body. The sheets of the first set are disposed alternately with the sheets of the second set, with the corrugations of the first set crossing the corrugations of the second set. These cross corrugations define passageways penetrating from edge to edge of the contact body. The corrugations of the corrugated sheets bear against one another so that the sheets touch where the crests of their respective corrugations cross. The corrugations of the first set of sheets are inclined upwardly in the direction of gas flow and the corrugations of the second set of sheets are inclined downwardly in the direction of gas flow. The inclinations of the cross corrugations are non-symmetrical relative to a vertical plane extending perpendicular to the direction of the gas stream entering the body. The corrugations of the first set of sheets have a greater inclination to the horizontal plane than the corrugations in the second set of sheets and define a bisector of the angle between the corrugations of the two sheets which inclines downwardly in a direction opposite the direction of air flow. This counteracts the lateral displacement of the liquid airstream over the sheets under the action of gas flow.

The improvement provided by the present invention includes forming the corrugations of the first set of sheets with a smaller amplitude than the corrugations of the second set of sheets. This arrangement improves the efficiency of the contact body without any increase in pressure drop. Therefore, the contact body achieves the desirable results of the Munters' contact body described above and in U.S. Pat. No. 3,792,841, but with improved efficiency.

The above and other objects, features and advantages of this invention will be apparent in the following detailed description of an illustrative embodiment thereof, which is to be read in connection with the accompanying drawings, wherein:

FIG. 1 is a perspective view of a portion of a contact body made in accordance with the present invention;

FIG. 2 is an edge view of one sheet from one of the sets of sheets in the contact body of FIG. 1;

FIG. 3 is an edge view similar to FIG. 2 of a sheet from the other set of sheets in the contact body of FIG. 1;

FIG. 4 is a vertical longitudinal schematic section through a cooling tower adapted to use the contact body of the present invention;

FIG. 5 is an end view of two cross corrugated sheets of equal amplitude according to the prior art; and FIG. 6 is an end view of two cross corrugated sheets of different amplitude according to the present invention.

Referring now to the drawing in detail, and initially to FIGS. 1 and 4, a cooling tower T is disclosed which is similar to the cooling tower structure shown in U.S. Pat. No. 3,792,841. Cooling tower T contains two packings or contact bodies 10 surrounded by a casing 12 which has a water collecting space 14 formed at its base. Water is supplied to contact bodies 10 from above through distributors 24, or the like. For ease of illustration, distributors 24 have been shown as stationary devices or pipes with escape holes 26 on the lower side. However, a variety of different liquid distributing arrangements can be used in cooling towers and humidifiers as are known to those skilled in the art.

Contact bodies 10 consist of thin layers or sheets, which preferably are folded or corrugated and which are positioned vertically. The folds or corrugations cross one another in adjacent layers intersecting at an angle to one another within certain ranges. The corrugated sheets bear against one another and are bonded together at their points of contact by means of a suitable bonding agent. The lines 28 denote the corrugations in every second layer 29 and the dotted lines 30 denote the corrugations in the layers 31 therebetween (in the left pack in FIG. 4 only one pan of lines is shown for ease of illustration). In FIG. 1, one of the sheets 31 is the outer sheet and its lower left edge is folded back for illustrative purposes to illustrate the next adjacent sheet 29 having the corrugations 28 therein.

These corrugated sheets form channels or passageways which penetrate from one edge to the other of the contact body and produce both horizontal and vertical components of direction. The passageways have a continuously varying width from zero at the points of contact between the layers (also referred to as crotches 50) up to the maximum sum of the amplitudes of the corrugations. In the Munters' U.S. Pat. No. 3,792,841, the corrugations have the same -heights or amplitudes so that the passageways have a maximum height of double the amplitudes of the corrugations. FIG. 5 is an end view of two adjacent sheets arranged according to that patent.

Preferably, the corrugated sheets 29, 31 of the contact body are formed of a cellulose or a plastic material as is known in the art.

The water distributed from above over the top of the contact body flows downwardly along both sides of the sheets forming the contact body as a film, following a winding path in order to obtain a very high rate of interaction between the fluids per unit of surface of the layers. When the water flows down in the form of a thin film along the layers in a substantially vertical direction of flow, gas, e.g., air, enters through the openings 40 in casing 12 as indicated in the arrows 42, 44 in a substantially horizontal direction of flow into the passageways formed in the contact body. The air escapes through an outlet 18 within which a fan 20 with a driving motor 22 is provided. The water is withdrawn from the collecting space 14 through a conduit 34 controlled by a valve 36 to be recirculated in a known manner to the distributors 24.

As is known in the art, some of the water may be bled off as it becomes contaminated and makeup water can be added to the circulatory flow as necessary. In addition, the level of water in the collector can be controlled by a float mechanism 38 causing fresh water to be supplied to replace losses due to evaporation within the contact body.

In the illustrative embodiment, packings 10 are mounted so as to have their edges coincide with a horizontal and vertical plane, respectively. The folds or corrugations 30 in the first set of sheets 31 are arranged to form a larger angle to the horizontal plane than the folds 28 belonging to the layers 29 crossing this first set of sheets. Preferably, the angle of inclination of the corrugations relative to the horizontal plane is from 20° to 45° for the corrugations 30. The angle for the corrugations 28 in the second set of sheets is about 15°. Thus, the angle between the corrugations in the respective sets of sheets is less than 90° and typically is between 15° and 80°. Accordingly, the bisector of the angle between the corrugations of the respective folds or corrugations will slope downwardly towards the air intake side of the contact body.

As described in the Munters' patent, by arranging contact body sheets in this manner, the film of water passing over the sheets receives a lateral component of flow which is greater for the corrugations 30 than for the corrugations 28. When the film following one sheet in an inclined direction downwardly meets a contact point between the sheet and an adjacent sheet, the flow of film is changed to the opposite direction when being taken over by the crossing corrugations of the adjacent sheets. The effect is that the films are maintained along the sheet while the horizontal wind draft exercises a lateral force on the film on opposite sides to the lateral component resulting from the inclined bisector angle. The film flow is then undisturbed at much higher water loads and air velocities as compared to prior art devices where contact body corrugations had similar angles to the horizontal.

The major force acting on the liquid flowing in the contact bodies is gravity. Therefore, water tends to follow the corrugated sheets which have a steeper inclination to the horizontal. Conversely, the air or gas moving through the contact body horizontally will also take the path of least resistance, hence it will tend to follow the corrugated sheets having the least inclination to the horizontal. Varying angular relationships have been utilized for cross corrugated films, for example 60° by 30°; 45° by 30°; and 75° by 15°; however it has been found that the combination of 45° for the corrugations 30 and 15° for the corrugations 28 offers the best tradeoff between cooling efficiency, low propensity for liquid drift, and low resistance to air.

In accordance with the present invention applicant has found that the efficiency of previously proposed contact bodies can be improved substantially by utilizing a smaller flute amplitude for the steeper angle corrugations (i.e., the corrugations 30) than for the less steep angled corrugations 28. Thus, as illustrated for example in FIG. 3, the corrugations 30 have an amplitude A which is approximately one-half of the amplitude A of the corrugations 28 (FIG. 2). Generally, the amplitudes of these corrugations may be in the ranges of ⅛ of an inch to ¾ of an inch. This construction provides a surface area for the liquid which tends to follow these steeper corrugations towards the air inlet side due to the effects of gravity and aids in keeping that side of the contact body cleaner than in previously proposed arrangements because there are less crotches where debris may collect (see FIG. 6). However, although the passageway dimensions are reduced as a result of this construction, the resulting media has a resistance to air flow which is very close to the prior art contact bodies wherein the amplitudes of the corrugations were the same, yet the cooling efficiency of the contact body of the invention is materially increased. In addition, the smaller water flow channels are kept clean due to the flushing action of the water and reduction of crotches.

For illustrative purposes applicant has conducted a number of tests comparing the prior art standard contact bodies with those of the present invention. These tests achieve the following results:

|  | Prior Art TEST 1 (¼" flutes) | Prior Art TEST 2 (¼" flutes) | Present Invention TEST 3 (⅛ + ¼" flutes) | (Test 3 Reversed) TEST 4 |
|---|---|---|---|---|
| FIRST SHEET AMPLITUDE | 0.46" | 0.25" | 0.46" | 0.25" |
| ANGLE TO HOR. | 15 DEG. | 15 DEG. | 15 DEG. | 15 DEG. |
| SECOND SHEET AMPLITUDE | 0.46" | 0.25" | 0.25" | 0.46" |
| ANGLE TO HOR. | 45 DEG. | 45 DEG. | 45 DEG. | 45 DEG. |
| 300 FPM AIR VELOCITY PRESSURE DROP | .022" WG | .050" WG | .023" WG | .043" WG |
| EFFICIENCY | 40.5% | 68.4% | 48.8% | 52.3% |
| 500 FPM AIR VELOCITY PRESSURE DROP | .058" WG | .120" WG | .061" WG | .109" WG |
| EFFICIENCY | 36.2% | 64.8% | 45.5% | 53.5% |
| 750 FPM AIR VELOCITY PRESSURE DROP | .145" WG | .233" WG | .145" WG | .225" WG |
| EFFICIENCY | 32.6% | 61.8% | 41.7% | 45.3% |

These tests demonstrate that the pressure drop or resistance to air flow in a contact body constructed in accordance with the present invention (Test 3) changes very slightly, if at all, as compared to standard contact bodies in which the amplitudes of the contact body's corrugations are the same (Test 1). Yet the efficiency of the contact body of the present invention using different sized amplitude corrugations in the respective sets of sheets results in an improved efficiency. Conversely, as shown in Test 4, by having the larger inclination corrugations 30 formed with a larger amplitude than the smaller inclination corrugations 28, efficiency, while increased slightly, is accompanied by very substantial and undesirable pressure drop. In addition, in the results of Test 4, it was found that water distribution was uneven and that dry spots occurred within the contact body.

Accordingly, it is seen that by the present invention an increased efficiency or cross-flow liquid gas contact units is achieved which permits the contact bodies to be made in a compact size with highly improved thermal and air pressure drop factors.

Although the present invention has been described herein in detail in connection with the accompanying drawings, it is to be understood that various changes and modifications may be effective therein without departing from the scope or spirit of this invention.

What is claimed is:

1. In a contact body for use in a gas and liquid contact apparatus in which the gas and the liquid flow in cross flow relationship to one another composed of first and second sets of corrugated sheets having corrugations defined in a direction transversely of the horizontal plane of said contact body, said sheets of the first set being disposed alternatively with the sheets of the second set, with the corrugations of the first set crossing the corrugations of the second set; said crossed corrugations defining passageways penetrating from edge to edge of the body, the corrugations of said corrugated sheets bearing against one another so that the sheets touch where the crests of their respective corrugations cross, the corrugations of the first set of sheets being inclined upwardly in the direction of gas flow, the corrugations of the second set of sheets inclining downwardly in the direction of gas flow, the inclinations of said crossed corrugations being non-symmetrical relative to a vertical plane extending perpendicular to the direction of a gas stream entering the body, the corrugations of said first set of sheets having a greater inclination to said horizontal plane than the corrugations in said second set of sheets and defining a bisector of the angle between said corrugations of said two sets of sheets inclining downwardly in a direction opposite to the direction of air flow thereby counteracting a lateral displacement of the liquid air stream over the sheets under action of gas flow, wherein the improvement comprises, said corrugations of said first set of sheets having a smaller amplitude then the corrugations of the second set of sheets.

2. In a contact body as defined in claim 1 wherein the angle between the crossed corrugations of said adjacent sheets taken in the direction of gas flow is in the range of from 20° to 80°.

3. In a contact body as defined in claim 2 wherein the corrugations of said first set of sheets are located at an angle of between 30° and 60° from the horizontal and the corrugations of said second set of sheets are located at an angle of 10° to 45° from the horizontal.

4. In a contact body as defined in claim 3 wherein the amplitude of the corrugations of the first set of sheets is approximately 0.20 to 0.25 inches.

5. In a contact body as defined in claim 4 wherein the amplitude of the corrugations of the second set of sheets is between 0.25 and 0.60 inches.

6. In a contact body as defined in claim 5 wherein the amplitude of the corrugations of the second set of sheets is 0.46 inches.

7. In a contact body for use in a gas and liquid contact apparatus in which the gas and the liquid flow in cross flow relationship to one another and being composed of first and second sets of corrugated sheets having corrugations disposed in a direction transversely of the horizontal plane of the contact body, said sheets of said first set being disposed alternately with the sheets of the second set with the corrugations of the first set crossing the corrugations of the second set and defining passageways penetrating from edge to edge of said body, and bearing against one another so that the sheets touch where the crests of their respective corrugations cross; the corrugations of the first set of sheets being inclined upwardly in the direction of gas flow and the corrugations of the second set of sheets inclining downwardly in the direction of gas flow, the inclinations of said crossed corrugations being non-symmetrical relative to the gas stream entering the passageways of the body at the edges of the sets of corrugated sheets, and the corrugations of the first set of sheets having a greater inclination to the horizontal plane than the corrugations in the second set of sheets and defining a bisector of the angle between said corrugations of said two sets of sheets inclining downwardly in a direction opposite to the direction of the air flow thereby counteracting a lateral displacement of the liquid stream over the sheets under action of the gas flow, wherein the improvement comprises said corrugations of said first set of sheets having a smaller amplitude than the corrugations of the second set of sheets.

8. In a contact body as defined in claim 7 wherein the angle between the crossed corrugations of said adjacent sheets taken in the direction of gas flow is in the range of from 15° to 80°.

9. In a contact body as defined in claim 8 wherein the corrugations of said first set of sheets are located at an angle of between 30° and 60° from the horizontal and the corrugations of said second set of sheets are located at an angle of 10° to 45° from the horizontal.

10. In a contact body as defined in claim 9 wherein the amplitude of the corrugation of the first set of sheets is approximately 0.20 to 0.30 inches.

11. In a contact body as defined in claim 10 wherein the amplitude of the corrugations of the second set of sheets is between 0.25 and 0.50 inches.

12. In a contact body as defined in claim 11 wherein the amplitude of the corrugations of the second set of sheets is 0.46 inches.

* * * * *